(12) United States Patent  
Dimitropoulos et al.

(10) Patent No.: US 7,937,388 B2
(45) Date of Patent: May 3, 2011

(54) PROBABILISTIC LOSSY COUNTING

(75) Inventors: Xenofontas Dimitropoulos, Zurich (CH); Paul T. Hurley, Zurich (CH); Andreas Kind, Kilchberg (CH); Marc Stoecklin, Basel (CH)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 12/194,784

(22) Filed: Aug. 20, 2008

(65) Prior Publication Data

US 2010/0049700 A1    Feb. 25, 2010

(51) Int. Cl.
G06F 7/00    (2006.01)

(52) U.S. Cl. .................................................. 707/727

(58) Field of Classification Search .................. 707/727, 707/730

See application file for complete search history.

(56) References Cited

U.S. PATENT DOCUMENTS

2009/0112863 A1*    4/2009    Lee .................................. 707/6

OTHER PUBLICATIONS

Dimitropoulos et al., Probabilistic Lossy Counting: An Efficient Algorithm for Finding Heavy Hitters, Computer Communication Review, Jan. 2008, pp. 5-16, vol. 38 No. 1, ACM SIGCOMM, USA.

* cited by examiner

*Primary Examiner* — Pierre M Vital
*Assistant Examiner* — Truong V Vo
(74) *Attorney, Agent, or Firm* — Cantor Colburn LLP; Stephen Kaufman

(57) ABSTRACT

A method for probabilistic lossy counting includes: for each element in a current window, determining whether an entry corresponding to a current element is present in a table; in the event an entry corresponding to the current element is present in the table, incrementing a frequency counter associated with the current element; otherwise, inserting an entry into a table, wherein inserting an entry comprises: calculating a probabilistic error bound $\Delta$ based on an index i of the current window; and inserting the probabilistic error bound $\Delta$ and a frequency counter into an entry corresponding to the current element in the table; and at the end of the current window, removing all elements from the table wherein the sum of the frequency counter and probabilistic error bound $\Delta$ associated with the element is less than or equal to the index of the current window.

6 Claims, 3 Drawing Sheets

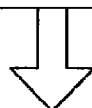
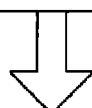
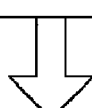
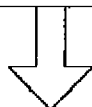
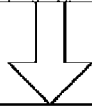

100

SPLIT INPUT STREAM INTO WINDOWS
101

INITIALIZE TABLE
102

PROCESS ELEMENTS IN CURRENT WINDOW
103

AT END OF CURRENT WINDOW, REMOVE ENTRIES FROM TABLE FOR WHICH THE SUM OF THE FREQUENCY COUNTER AND THE PROBABALISTIC ERROR BOUND ARE LESS THAN THE INDEX OF THE CURRENT WINDOW
104

PROCESS NEXT WINDOW
(RETURN TO STEP 103 WITH NEXT WINDOW AS CURRENT WINDOW)
105

IN RESPONSE TO HEAVY HITTER QUERY, RETURN ENTRIES IN TABLE FOR WHICH THE SUM OF THE FREQUENCY COUNTER AND THE PROBABALISTIC ERROR BOUND EXCEED A THRESHOLD
106

FIG. 1

PROBABILISTIC LOSSY COUNTING

BACKGROUND

This disclosure relates generally to the field of network traffic analysis, and more specifically to determination of heavy-hitters given a stream of elements.

Determining the largest traffic flows in a network is important for many network management applications; this determination is known as the heavy-hitter problem. Heavy-hitter information is useful for applications such as identifying denial of service (DoS) attacks, monitoring traffic growth trends, provisioning network resources and link capacities, and identifying heavy network users that may need to reduce usage. In addition, determination of heavy hitters has applications for search engines that may compute heavy-hitter queries in order to optimize caching for such queries, and dynamic content providers that may keep track of frequently-clicked advertisements.

The problem of determining heavy hitters involves finding the specific elements within a stream of elements with a frequency above a user-selected threshold. Each element may represent a flow, and a sequence of identical elements may represent bytes or packets of a flow. A flow is typically defined as the set of packets that have common values in one or more packet-header fields. The most common flow definition is a five-tuple of the following packet-header fields: source and destination IP addresses, source and destination port numbers, and protocol number. An element identifier may be stored for each traffic flow with a corresponding counter monitoring the number of occurrences of that traffic flow. Sorting the elements according to their respective counters will generate a list of heavy hitting flows. However, this solution may not be feasible in some situations. Data streams may have a very large number of distinct elements, which may result in overwhelming and unpredictable memory requirements for storing element identifiers and counters. Consider the case of a NetFlow collector that computes the traffic flows that have generated the most traffic over a period of a month. In a small enterprise network, the number of unique five-tuple flows over a period of a month may be close to 100 million, which corresponds to 2.5 GBytes of memory for storing 136-bit flow identifiers and 64-bit counters. Such large memory requirements prohibit the use of the simple solution in NetFlow collectors and in other systems for computing heavy hitters of data streams with large numbers of distinct elements. Use of a large amount of disk space to store flow identifiers and counters may also severely impact system performance, slowing down processing times.

There are alternate techniques for computing heavy hitters using fixed or bounded memory resources. Lossy counting approximates the heavy hitters of a data stream by estimating the frequencies of elements in a stream to find heavy hitters. Lossy counting may operate as follows: an input stream of elements is split into fixed-size windows, and each window is processed sequentially. For each element in a window, an entry is inserted into a table, or, if the element is already in the table, the element's frequency counter is updated. At the end of each window, elements of low frequency are removed from the table. The table therefore maintains a relatively small number of entries. A deterministic error bound is also stored for each element in the table; the deterministic error bound is equal to the index of the current window minus 1. The error bound reflects the potential error of the estimated frequency of an element due to possible prior removal(s) at the end of a prior window of the element from the table. An element with a small error bound is more likely to be removed from the table than an equal-frequency element having a large error bound. However, lossy counting may still require a large amount of memory and processing power, and the computed heavy hitters may include false positives.

There exists a need for a method of determining heavy-hitters that is accurate while requiring relatively low amounts of memory and processing power.

BRIEF SUMMARY

An exemplary embodiment of a probabilistic lossy counting method includes: splitting the input stream of elements into a plurality of fixed-size windows; and processing each of the plurality of windows sequentially by performing the following: for each element in a current window, determining whether an entry corresponding to a current element is present in a table; in the event an entry corresponding to the current element is present in the table, incrementing a frequency counter associated with the current element; in the event the entry corresponding to the current element is not present in the table, inserting an entry into a table corresponding to the current element, wherein inserting an entry comprises: calculating a probabilistic error bound $\Delta$ corresponding to the current element based on an index i of the current window; and inserting the probabilistic error bound $\Delta$ and a frequency counter corresponding to the current element into an entry corresponding to the current element in the table; and at the end of the current window, removing all elements from the table wherein the sum of the frequency counter and probabilistic error bound $\Delta$ associated with the element is less than or equal to the index of the current window.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 1 illustrates an embodiment of a method for probalistic lossy counting.

DETAILED DESCRIPTION

Figure 2:
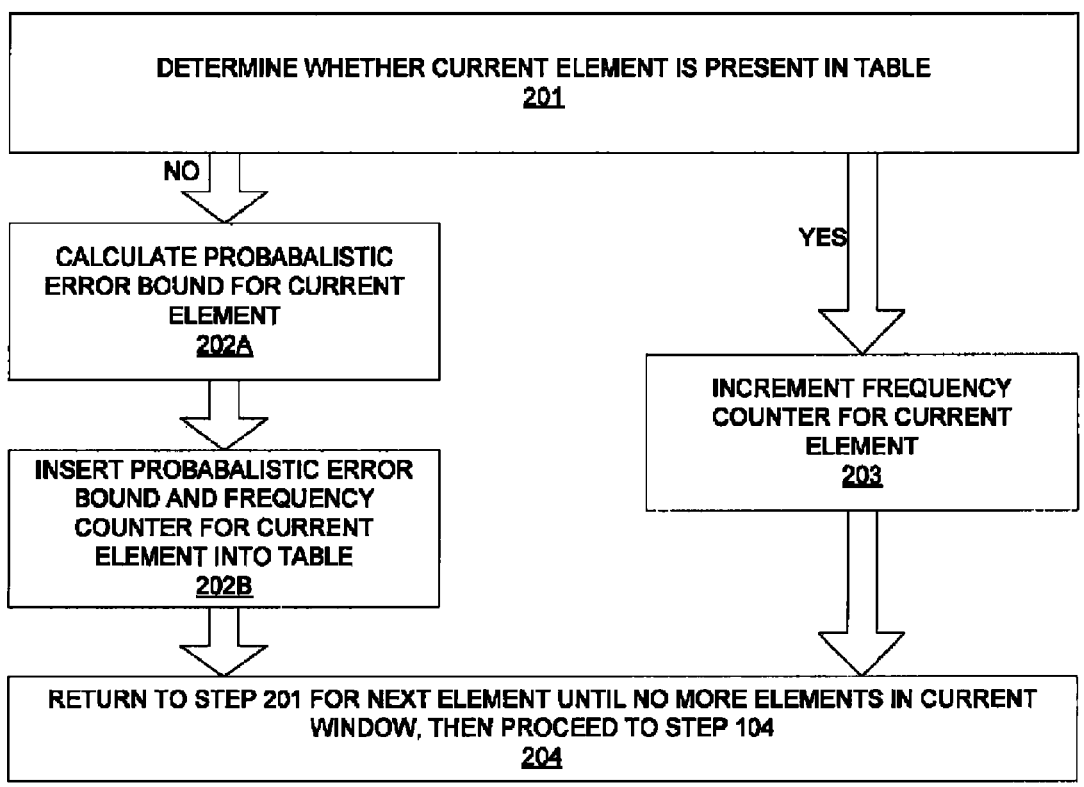
FIG. 2 illustrates an embodiment of a method for processing elements in a window.

Embodiments of a method for probabilistic lossy counting (PLC) are provided, with exemplary embodiments being discussed below in detail.

PLC changes the error bound based on the estimated size of an arbitrary traffic flow, in contrast to the deterministic error bound used in lossy counting. The probabilistic error bound makes PLC more likely to remove a flow of small size than lossy counting. Given that flows of small size account for the majority of network traffic flows, removal of small flows significantly reduces the memory required for computing heavy hitters. The probabilistic-based error bound substantially improves the memory consumption of PLC over lossy counting. PLC may also produce a lower rate of false positives than lossy counting, with a low estimation error. For a detailed comparison of lossy counting versus PLC, see "Probabalistic Lossy Counting: An efficient algorithm for finding heavy hitters", by Xenofontas Dimitropoulos, Paul Hurley, and Andreas Kind, ACM SIGCOMM Computer Communication Review, vol. 38, no. 1, pages 5-16, January 2008.

The error bound associated with each element is used to determine which elements to remove from the table. An element is removed if the sum of its frequency and error bound is less than or equal to a given threshold, which results in elements with a large error bound remaining in the table over many windows. The number of entries in the table is analogous to the queue occupancy problem. When elements stay in the table for more windows, the average size of the table increases. Thus, the value of the error bound has a direct impact on memory consumption. The probabilistic error bound of PLC is substantially smaller than the deterministic error bound of lossy counting. As a result, low-frequency elements stay in the table for fewer windows in PLC, resulting in lower memory consumption. The probabilistic error bound guarantees with a desired probability $1-\delta$, where $\delta \ll 1$, that the error of the frequency of an element is smaller than the bound.

A data stream may comprise a set E of elements, which may be a sequence of elements $e_1, e_2, \ldots e_n$. A traffic data stream may be mapped into a stream of elements by associating a unique element with each different flow and repeating multiple copies of the appropriate element to denote the packets or bytes of a particular flow. If N is the length of the input stream at some given point, and s a value in (0, 1), then a heavy-hitter algorithm seeks to find the elements with frequency larger than sN.

FIG. 1 shows a method 100 for performing probabilistic lossy counting (PLC). In block 101, an input stream is split into fixed-size windows of $w=[1/\epsilon]$ elements, where $\epsilon$ is an error parameter ($\epsilon \ll 1$). The table of elements (e), frequency counters ($\hat{c}$), and error bounds ($\Delta$) is initialized to empty at block 102. Windows are processed sequentially starting a block 103; each window is indexed with an integer i such that $1 \leq i \leq [N/w]$. Processing of the elements in the current window is discussed in further detail below with regards to FIG. 2. At the end of each window, entries are deleted from the table for which $\hat{c}+\Delta \leq i$ (i being the index of the current window) in block 104. At block 105, processing returns to block 103 for the next window. In block 106, all entries with $\hat{c}+\Delta \geq sN$ are returned in response to a heavy hitter query.

FIG. 2 shows a method 200 for processing elements in a current window (block 103). Each element e in a current window is checked to determine whether it is already in the table in block 201. If the element is not in the table, a probabilistic error bound $\Delta$ based on the index i of the current window is calculated for the element in block 202a, and a new table entry $(e,\hat{c},\Delta)$ is inserted in the table in block 202b, with the estimated frequency counter $\hat{c}$ of the element initialized to 1. If e is already in the table, its estimated frequency counter $\hat{c}$ is incremented by one in block 203. When there are no more elements in the current table, at block 204, processing returns to block 104 of FIG. 1.

Removing an element from the table may introduce a subsequent error in its estimated frequency. If a removed element later re-enters the table, then its new frequency does not reflect the earlier removal. Obviously, this error can only underestimate the true frequency of an element, as the frequency counter ($\hat{c}$) is only incremented when a corresponding element is observed. The true frequency c of an element in the table is bounded by $\hat{c} \leq c \leq \hat{c}+i$ with probability $1-\delta$. In other words, $i=N/w=\epsilon N$ is a probabilistic bound on the estimation error associated with any element. PLC has an overall error bound $\epsilon N$, whereas each element in the table has an individual error bound $\Delta$. Error bound $\Delta$ is calculated for each element that is inserted into the table.

Calculating the probabilistic error bound $\Delta$ on the estimated frequency $\hat{c}$ of an element $e_n$, as is performed in block 202a of FIG. 2, may be performed as follows. An element $e_n$ inserted in the table may have an error due to prior removal(s) of the element from the table at the end of prior window(s). The error of the element $e_n$ is equal to its number of occurrences before it was last inserted in the table. If X is a random variable denoting the error of an element that is inserted at some point in the table, error bound $\Delta$ may be calculated using $Pr(X > \Delta) \leq \delta$, where $\delta$ is some small probability, say 0.05.

The size of network traffic flows tend to follow a Zipfian distribution; therefore, To calculate $\Delta$, the power-law cumulative distribution may be used. If Y is a random variable that denotes the true frequency of an element, then $Pr(Y>y)=\alpha y^\beta$, where $\alpha$ ($\alpha \leq 1$) and $\beta$ are parameters of the power-law distribution.

The error associated with elements inserted in the table is equal to the frequency of these elements. In addition, all elements inserted in the table at window i have true frequency smaller or equal to i−1 with probability $1-\delta$. From these two observations, it follows that $Pr(X>x)=Pr(Y>x|Y \leq i-1)$. The last expression relates the error of elements entering the table with the true frequency of these elements. The true frequency of an element is now assumed to be described by a power-law distribution. Using the expression of the power-law distribution and that $\alpha$, $Pr(Y>y) \geq 1$ we get:

$$Pr(X>x) = Pr(Y>x | Y \leq i-1) \quad (1)$$

$$= \frac{Pr(i-1 \geq Y > x)}{Pr(Y \leq i-1)}$$

$$= \frac{Pr(Y>x) - Pr(Y>i-1)}{1 - Pr(Y>i-1)}$$

$$= \frac{\alpha(x^\beta - (i-1)^\beta)}{1 - \alpha(i-1)^\beta} \leq \frac{x^\beta - (i-1)^\beta}{1 - (i-1)^\beta}$$

Setting the right side of Equation (1) to a small probability $\delta$ and solving for $x=\Delta$ yields:

$$\Delta = \sqrt[\beta]{\delta(1-(i-1)^\beta)+(i-1)^\beta} \quad (2)$$

Equation (2) therefore gives a closed form for computing the probabilistic error bound $\Delta$ of block 202a for data streams with power-law frequency distributions.

Calculating the power-law parameter $\beta$ used in Equation (2) is necessary for calculating the probabilistic error bound $\Delta$. With probability $1-\delta$, the table contains all elements with true frequency larger than i−1. The frequency distribution of these elements is:

$$Pr(Y>y|Y>i-1)=Pr(Y>y)/Pr(Y>i-1)=y^\beta/(i-1)^\beta$$

This frequency distribution follows a power-law with the same parameter $\beta$ as the overall frequency distribution of a data stream. Consequently, we can estimate $\beta$ by fitting a power-law on the frequency distribution of elements in the table with $\hat{c}>i-1$. This approach has the limitation of using the estimated frequencies $\hat{c}$ instead of the true frequencies c for computing $\beta$. In practice, the estimated frequencies are almost identical to the true frequencies, with the error being very small. For this reason, using the estimated ($\hat{c}$) instead of the true (c) frequency for computing $\beta$ introduces a negligible error.

In an alternate embodiment of PLC, a single parameter k may be used to calculate probabilistic error bound Δ in step 202a of FIG. 2. Parameter k (k<1) is a measure of how aggressive the system is, and is based on equation (2) above. Equation (2) behaves as a function, i.e.:

$$\Delta(i) \sim ki \qquad (3)$$

where k is a little bit less than 1 (k is a function of Δ and β). In other words, Δ increases approximately linearly with i, as can be seen by looking at the limit at infinity of equation (2). For smaller values of i, Δ is approximately ki. For larger values of i, Δ holds flat. Formally, $$k = \lim_{i \to \infty} \frac{\Delta_i}{i} \qquad (4)$$

In summary, PLC, as shown in FIG. 1, processes a data stream by, at the beginning of each window, using either Equation (2) or Equation (3) to compute the probabilistic error bound Δ of each new element that is inserted in the table during the window in block 105a. Parameter β is periodically estimated by fitting a power-law on the estimated frequencies of elements with $\hat{c} \geq i-1$.

Given a heavy-hitter query in block 108 of FIG. 1, PLC returns elements in the table with $\hat{c} \geq (s-\epsilon)N$. The returned elements include true heavy hitters with frequency larger than sN (a user-selected threshold), and possible false positives with a true frequency between $(s-\epsilon)N$ and sN. PLC may have a small probability of returning a false negative, i.e., omitting a heavy hitter. A false negative occurs if the error of an element exceeds the probabilistic error bound. The probability of false negatives may be made arbitrarily small by controlling the δ parameter.

PLC has the same memory bounds as lossy counting. The memory bound is $1/\epsilon \log(\epsilon N)$ for arbitrary data streams and $7/\epsilon$ for data streams in which the low-frequency elements appear uniformly at random, which is a property known to characterize real-world data streams. In addition, the bound is close to $2/\epsilon$ for data streams that exhibit Zipfian distributions.

The window length w or equivalently the error parameter ε, as $w=[1/\epsilon]$, are user-selected parameters. The choice of w affects the memory consumption and the estimation accuracy of PLC. The error bound of PLC is a function of w, and the empirical memory consumption is linearly dependent on w. A larger window results in observing a larger number of distinct elements within a window, and thus the number of table entries and the memory consumption increase with window size. In addition, the error parameter ε determines the overall error bound of εN.

Various approaches may be used to select an appropriate value of ε. One option is to use the available memory resources for computing heavy hitters and the memory bound to derive a value for w. Setting the memory bound to the available memory resources and solving for w gives a parameter choice that guarantees that PLC will not exceed the available memory resources. This approach is simple and provides strong guarantees on memory consumption. However, the empirical memory consumption of PLC may be significantly lower than the memory bound. As a result, PLC will not fully use the available memory resources for computing heavy hitters and the system will be over-provisioned.

A second option is to empirically evaluate the memory consumption of PLC in the target environment using training data. The memory consumption of PLC achieves its maximum in the first few windows, and then decreases with time. Using training data, maximum memory consumption may be measured for different values of w. Selecting the value of w that results in maximum memory usage close to the available memory resources addresses the over-provisioning problem of the first option. However, this approach relies on training data for the target environment and requires conducting experiments to determine w.

A third option is to select the error parameter ε based on a desired bound on estimation accuracy. For example, a user seeking to find heavy hitters with frequency larger than sN can select an appropriate value of ε so that the bound on the estimation error εN is small compared with the threshold for heavy hitters sN.

The choice of one of the three methods for dimensioning PLC depends on the priorities and requirements of a user. The first and third choice provide strong guarantees on the memory consumption and estimation accuracy of PLC, whereas the second choice utilizes better available memory resources and tailors operation to the specifics of the target environment.

Figure 3:
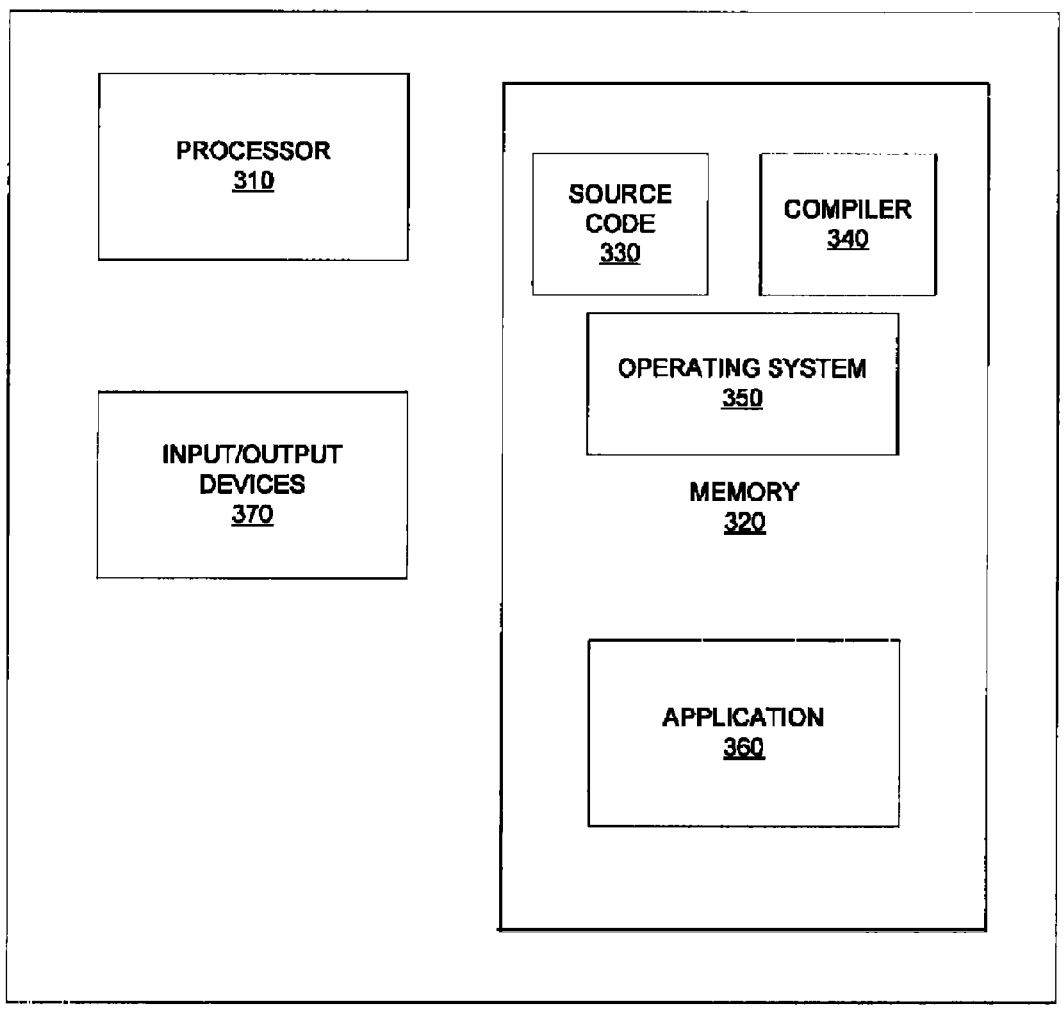
FIG. 3 illustrates an embodiment of a computer that may be used in conjunction with a method for probabilistic lossy counting.

FIG. 3 illustrates an example of a computer 300 having capabilities, which may be utilized by exemplary embodiments of a method for probabilistic lossy counting as embodied in software. Various operations discussed above may utilize the capabilities of the computer 300. One or more of the capabilities of the computer 300 may be incorporated in any element, module, application, and/or component discussed herein.

The computer 300 includes, but is not limited to, PCs, workstations, laptops, PDAs, palm devices, servers, storages, and the like. Generally, in terms of hardware architecture, the computer 300 may include one or more processors 310, memory 320, and one or more input and/or output (I/O) devices 370 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 310 is a hardware device for executing software that can be stored in the memory 320. The processor 310 can be virtually any custom made or commercially available processor, a central processing unit (CPU), a data signal processor (DSP), or an auxiliary processor among several processors associated with the computer 300, and the processor 310 may be a semiconductor based microprocessor (in the form of a microchip) or a macroprocessor.

The memory 320 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 320 may incorporate electronic, magnetic, optical, and/or other types of storage media. Note that the memory 320 can have a distributed architecture, where various components are situated remote from one another, but can be accessed by the processor 310.

The software in the memory 320 may include one or more separate programs, each of which comprises an ordered listing of executable instructions for implementing logical functions. The software in the memory 320 includes a suitable operating system (O/S) 350, compiler 340, source code 330, and one or more applications 360 in accordance with exemplary embodiments. As illustrated, the application 360 comprises numerous functional components for implementing the features and operations of the exemplary embodiments. The application 360 of the computer 300 may represent various applications, computational units, logic, functional units, processes, operations, virtual entities, and/or modules in accordance with exemplary embodiments, but the application 360 is not meant to be a limitation.

The operating system 350 controls the execution of other computer programs, and provides scheduling, input-output control, file and data management, memory management, and communication control and related services. It is contemplated by the inventors that the application 360 for implementing exemplary embodiments may be applicable on all commercially available operating systems.

Application 360 may be a source program, executable program (object code), script, or any other entity comprising a set of instructions to be performed. When a source program, then the program is usually translated via a compiler (such as the compiler 340), assembler, interpreter, or the like, which may or may not be included within the memory 320, so as to operate properly in connection with the O/S 350. Furthermore, the application 360 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 370 may include input devices such as, for example but not limited to, a mouse, keyboard, scanner, microphone, camera, etc. Furthermore, the I/O devices 370 may also include output devices, for example but not limited to a printer, display, etc. Finally, the I/O devices 370 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 370 also include components for communicating over various networks, such as the Internet or intranet.

If the computer 300 is a PC, workstation, intelligent device or the like, the software in the memory 320 may further include a basic input output system (BIOS) (omitted for simplicity). The BIOS is a set of essential software routines that initialize and test hardware at startup, start the O/S 350, and support the transfer of data among the hardware devices. The BIOS is stored in some type of read-only-memory, such as ROM, PROM, EPROM, EEPROM or the like, so that the BIOS can be executed when the computer 300 is activated.

When the computer 300 is in operation, the processor 310 is configured to execute software stored within the memory 320, to communicate data to and from the memory 320, and to generally control operations of the computer 300 pursuant to the software. The application 360 and the O/S 350 are read, in whole or in part, by the processor 310, perhaps buffered within the processor 310, and then executed.

When the application 360 is implemented in software it should be noted that the application 360 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 360 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 360 is implemented in hardware, the application 360 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include accurate determination of heavy hitters with low memory consumption and faster processing.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the inven-

The invention claimed is:

1. A method for finding the elements of an input stream with frequency above a threshold, the method comprising:
   splitting the input stream of elements into a plurality of fixed-size windows; and
   processing each of the plurality of windows sequentially by performing the following:
      for each element in a current window, determining whether an entry corresponding to a current element is present in a table;
      in the event an entry corresponding to the current element is present in the table, incrementing a frequency counter associated with the current element;
      in the event the entry corresponding to the current element is not present in the table, inserting an entry into a table corresponding to the current element, wherein inserting an entry comprises:
         calculating a probabilistic error bound $\Delta$ corresponding to the current element based on an index i of the current window; and
         inserting the probabilistic error bound $\Delta$ and a frequency counter corresponding to the current element into an entry corresponding to the current element in the table; and
      at the end of the current window, removing all elements from the table wherein the sum of the frequency counter and probabilistic error bound $\Delta$ associated with the element is less than or equal to the index of the current window;
      wherein computing the probabilistic error bound $\Delta$ comprises applying one of the following formulas:
         $\Delta = \beta\sqrt{\delta(1-(i-1)^\beta)+(i-1)^\beta}$, where $\Delta$ is the probabilistic error bound, $\beta$ is a parameter of the power law distribution, $\delta$ is a small probability, and i is an index of the current window, or
         $\Delta \sim k \ast i$, where k is a measure of aggression and i is an index of the current window.

2. The method according to claim 1, wherein the input stream is mapped onto a stream of elements by associating an element with a flow in the input stream, and repeating multiple copies of the element for each component of the flow present in the input stream.

3. The method according to claim 1, further comprising returning elements in the table for which the sum of the frequency counter and the probabilistic error bound $\Delta$ exceed the threshold.

4. A computer program product comprising a computer readable storage medium containing computer code that, when executed by a computer, implements a method for finding the elements of an input stream with frequency above a threshold, wherein the method comprises:
   splitting the input stream of elements into a plurality of fixed-size windows; and
   processing each of the plurality of windows sequentially by performing the following:
      for each element in a current window, determining whether an entry corresponding to a current element is present in a table;
      in the event an entry corresponding to the current element is present in the table, incrementing a frequency counter associated with the current element;
      in the event the entry corresponding to the current element is not present in the table, inserting an entry into a table corresponding to the current element, wherein inserting an entry comprises:
         calculating a probabilistic error bound $\Delta$ corresponding to the current element based on an index i of the current window; and
         inserting the probabilistic error bound $\Delta$ and a frequency counter corresponding to the current element into an entry corresponding to the current element in the table; and
      at the end of the current window, removing all elements from the table wherein the sum of the frequency counter and probabilistic error bound $\Delta$ associated with the element is less than or equal to the index of the current window;
      wherein computing the probabilistic error bound $\Delta$ comprises applying one of the following formulas:
         $\Delta = \beta\sqrt{\delta(1-(i-1)^\beta)+(i-1)^\beta}$, where $\Delta$ is the probabilistic error bound, $\beta$ is a parameter of the power law distribution, $\delta$ is a small probability, and i is an index of the current window, or
         $\Delta \sim k \ast i$, where k is a measure of aggression and i is an index of the current window.

5. The computer program product according to claim 4, wherein the input stream is mapped onto a stream of elements by associating an element with a flow in the input stream, and repeating multiple copies of the element for each component of the flow present in the input stream.

6. The computer program product according to claim 4, further comprising computer code for returning elements in the table for which the sum of the frequency counter and the probabilistic error bound $\Delta$ exceed the threshold.

* * * * *